United States Patent
Shrivastava et al.

(10) Patent No.: US 9,164,528 B2
(45) Date of Patent: Oct. 20, 2015

(54) APPARATUS AND METHOD FOR CONTROLLING INDUCTOR CURRENT IN A SWITCH MODE POWER SUPPLY

(71) Applicant: TEXAS INSTRUMENTS INCORPORATED, Dallas, TX (US)

(72) Inventors: Aatmesh Shrivastava, Cambridge, MA (US); Yogesh Ramadass, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 441 days.

(21) Appl. No.: 13/768,448

(22) Filed: Feb. 15, 2013

(65) Prior Publication Data

US 2014/0103898 A1    Apr. 17, 2014

Related U.S. Application Data

(60) Provisional application No. 61/715,083, filed on Oct. 17, 2012.

(51) Int. Cl.
    *H02M 3/156* (2006.01)
    *G05F 3/08* (2006.01)
    *H02J 1/00* (2006.01)
    *H02M 3/158* (2006.01)

(52) U.S. Cl.
    CPC ... *G05F 3/08* (2013.01); *H02J 1/00* (2013.01); *H02M 3/1563* (2013.01); *H02M 3/1582* (2013.01); *Y10T 307/50* (2015.04); *Y10T 307/696* (2015.04)

(58) Field of Classification Search
    CPC ................. H02M 3/156; H02M 3/1563
    USPC ...................................... 323/382, 388
    See application file for complete search history.

(56) References Cited

U.S. PATENT DOCUMENTS

| | | | |
|---|---|---|---|
| 6,381,159 B2 * | 4/2002 | Oknaian et al. | 363/98 |
| 6,879,136 B1 * | 4/2005 | Erisman et al. | 323/282 |
| 7,145,316 B1 * | 12/2006 | Galinski, III | 323/288 |
| 7,372,241 B1 * | 5/2008 | Tomiyoshi | 323/288 |
| 7,710,084 B1 * | 5/2010 | Guo | 323/224 |
| 7,714,556 B2 * | 5/2010 | Chu et al. | 323/282 |
| 8,476,882 B2 * | 7/2013 | Luo et al. | 323/282 |
| 2005/0206358 A1 * | 9/2005 | Van Der Horn et al. | 323/282 |
| 2008/0088292 A1 * | 4/2008 | Stoichita et al. | 323/285 |
| 2010/0181983 A1 * | 7/2010 | Ouyang | 323/283 |

* cited by examiner

*Primary Examiner* — Timothy J Dole
*Assistant Examiner* — Ishrat Jamali
(74) *Attorney, Agent, or Firm* — John R. Pessetto; Frank D. Cimino

(57) ABSTRACT

Apparatus and method for controlling inductor current in a switch mode power supply. In one embodiment, a switch mode power supply includes an inductor, a high-side switch coupled to the inductor, a low-side switch coupled to the inductor, and a controller. The controller is coupled to at least one of the high-side switch and the low-side switch. The controller includes a first capacitor and a current source. The controller is configured to control timing of current switching to the inductor by enabling current flow through the at least one of the high-side switch and the low-side switch based on time to charge the first capacitor via the current source. The time is a function of voltage across the inductor.

18 Claims, 4 Drawing Sheets

APPARATUS AND METHOD FOR CONTROLLING INDUCTOR CURRENT IN A SWITCH MODE POWER SUPPLY

CROSS-REFERENCE TO RELATED APPLICATION

The present application claims priority to U.S. Provisional Patent Application No. 61/715,083, filed on Oct. 17, 2012 which is hereby incorporated herein by reference in its entirety.

BACKGROUND

A switch-mode power supply (SMPS) is an electronic circuit that converts an input direct current (DC) supply voltage into one or more DC output voltages that are higher or lower in magnitude than the input DC supply voltage. An SMPS that generates an output voltage lower than the input voltage is termed a buck or step-down converter. An SMPS that generates an output voltage higher than the input voltage is termed a boost or step-up converter.

A typical SMPS includes a switch for alternately opening and closing a current path through an inductor in response to a switching signal. In operation, a DC voltage is applied across the inductor. Electrical energy is transferred to a load connected to the inductor by alternately opening and closing the switch as a function of the switching signal. The amount of electrical energy transferred to the load is a function of the duty cycle of the switch and the frequency of the switching signal. Switch-mode power supplies are widely used to power electronic devices, particularly battery-powered devices, such as portable cellular phones, laptop computers, and other electronic systems in which efficient use of power is desirable.

SUMMARY

Apparatus and method for controlling inductor current in a switch mode power supply are disclosed herein. In one embodiment, a switch mode power supply includes an inductor, a high-side switch coupled to the inductor, a low-side switch coupled to the inductor, and a controller. The controller is coupled to at least one of the high-side switch and the low-side switch. The controller includes a first capacitor and a current source. The controller is configured to control timing of current switching to the inductor by enabling current flow through the at least one of the high-side switch and the low-side switch based on time to charge the first capacitor via the current source. The time is a function of voltage across the inductor.

In another embodiment, a controller for a switch mode power supply includes a current source; and switch timing circuitry. The switch timing circuitry is configured to control the switch timing of at least one of a high side transistor and a low side transistor that switch current in an inductor of the switch mode power supply. The timing circuitry includes a first charging node and transistor driver circuitry. The transistor driver circuitry is coupled to the current source. The transistor driver circuitry is configured to generate the timing based on time to change, via a current provided by the current source, a voltage at the charging node between voltages that are proportional to an input voltage of the inductor and an output voltage of the inductor. The timing provides at least one of a peak current in the inductor and a prediction of current zero crossing in the inductor.

In a further embodiment, a method for controlling current in an inductor of a switch mode power supply includes charging a first capacitor from a first voltage to a second voltage. The first and second voltages are proportional to the voltages at one of an input and an output of the inductor. One of a high side switch and a low side switch coupled to the inductor is enabled for the duration of the charging. At least one of peak current in the inductor and a prediction of current zero crossing in the inductor is provided based on the duration of the charging.

BRIEF DESCRIPTION OF THE DRAWINGS

For a detailed description of various examples, reference will now be made to the accompanying drawings in which.

NOTATION AND NOMENCLATURE

Figure 1:
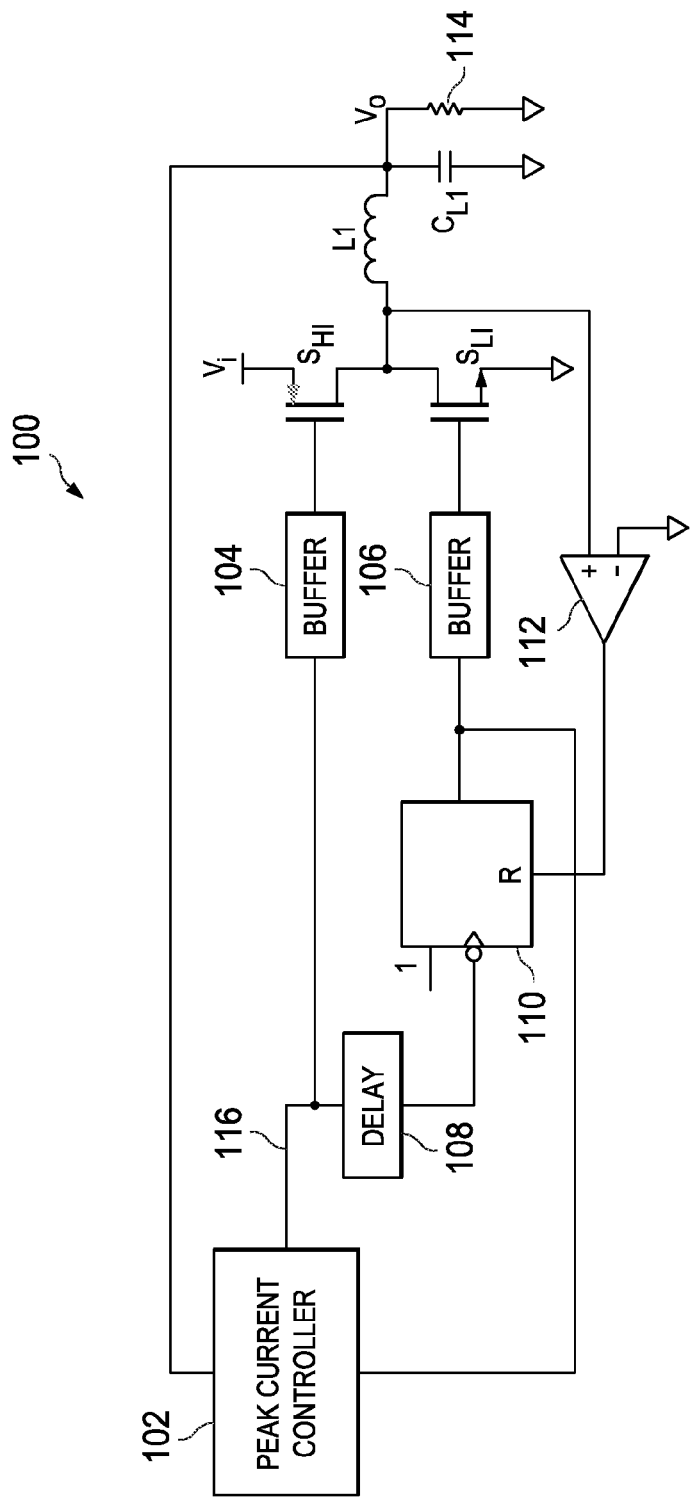
FIG. 1 shows a schematic diagram of a switch mode power supply arranged as a buck converter in accordance with various embodiments.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect or direct electrical connection. Thus, if a first device couples to a second device, that connection may be through a direct electrical connection, or through an indirect electrical connection via other devices and connections. The recitation "based on" is intended to mean "based at least in part on." Therefore, if X is based on Y, X may be based on Y and any number of other factors.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

In a switch mode power supply (SMPS), such as a buck converter, current in the inductor of the SMPS is driven to a peak value every cycle. The peak current determines the amount of energy that is transferred each cycle, and is therefore important to the efficiency of the SMPS. Setting the peak current high increases conduction losses, while setting the peak current low increases switching loss. Consequently, controlling peak current in the inductor is important for optimizing SMPS performance.

Conventional SMPS designs attempt to determine the current in the inductor by measuring the voltage drop across a switching transistor through which current is provided to the inductor. The measured voltage drop across the transistor is compared to a predetermined threshold value. When the voltage drop exceeds the threshold value, the peak current is assumed to have been reached and the flow of current through the transistor is disabled. Unfortunately, controlling peak inductor current in this manner is subject to various errors. For example, minute variations in resistance across switching transistors can result in substantial inaccuracies (e.g., ±50%) in peak current determination.

Embodiments of the present disclosure provide accurate control of peak current in the inductor of an SMPS without requiring switching transistor voltage drop measurements. Thus, embodiments are not subject to errors in peak current determination induced by transistor variations as in conventional SMPS architectures. Embodiment of the SMPS disclosed herein control the switching times of transistors driving the inductor, and in turn control the peak current in the inductor, as a function of input and output voltages of the inductor corresponding to peak inductor current.

FIG. 1 shows a schematic diagram of an SMPS 100 arranged as a buck converter in accordance with various embodiments. The SMPS 100 includes an inductor L1 coupled on one side to a capacitor $C_{L1}$ and a load 114, and coupled on the other side to drive transistors $S_{H1}$ and $S_{L1}$. Transistor $S_{H1}$ is a high side switch that when closed connects the inductor L1 to voltage $V_i$ causing current to rise in the inductor L1. Transistor $S_{L1}$ is a low side switch that when closed connects the inductor L1 to ground.

The timing of transistor $S_{H1}$ and $S_{L1}$ activation and deactivation is controlled by a peak current controller 102. Assertion of high side switch control signal 116 by the peak current controller 102, buffered by the buffer 104, activates transistor $S_{H1}$. Negation of high side switch control signal 116 by the peak current controller 102, sets flip/flop 110, after delay 108. The output of flip/flop 110, buffered by buffer 106, activates transistor $S_{L1}$. Comparator 112 resets flip/flop 110 based on the voltage at the input side of the inductor L1.

For the SMPS 100, the peak current in the inductor L1 is a function of the time that the switch $S_{H1}$ is closed. The voltage across the inductor L1 may be expressed as a function of inductance, current, and time:

$$V = L\frac{di}{dt} \quad (1)$$

Correspondingly, when the voltage drop across the high-side switch $S_{H1}$ is small, the relationship of the peak current in the inductor L1 to the switch $S_{H1}$ active (i.e., closed) time may be expressed as:

$$T_{H1} = \frac{LI_P}{(V_i - V_O)} \quad (2)$$

$$I_P = \frac{T_{H1}(V_i - V_O)}{L} \quad (3)$$

where:

$I_P$ is the peak current in the inductor L1;

L is the inductance of the inductor L1;

$V_i$ is the voltage at the input side of the inductor L1 (i.e., the voltage sourced through the high side switch $S_{H1}$.

$V_O$ is the voltage at the output side of the inductor L1; and $T_{H1}$ is the time during which the high side switch $S_{H1}$ is closed.

Figure 2:
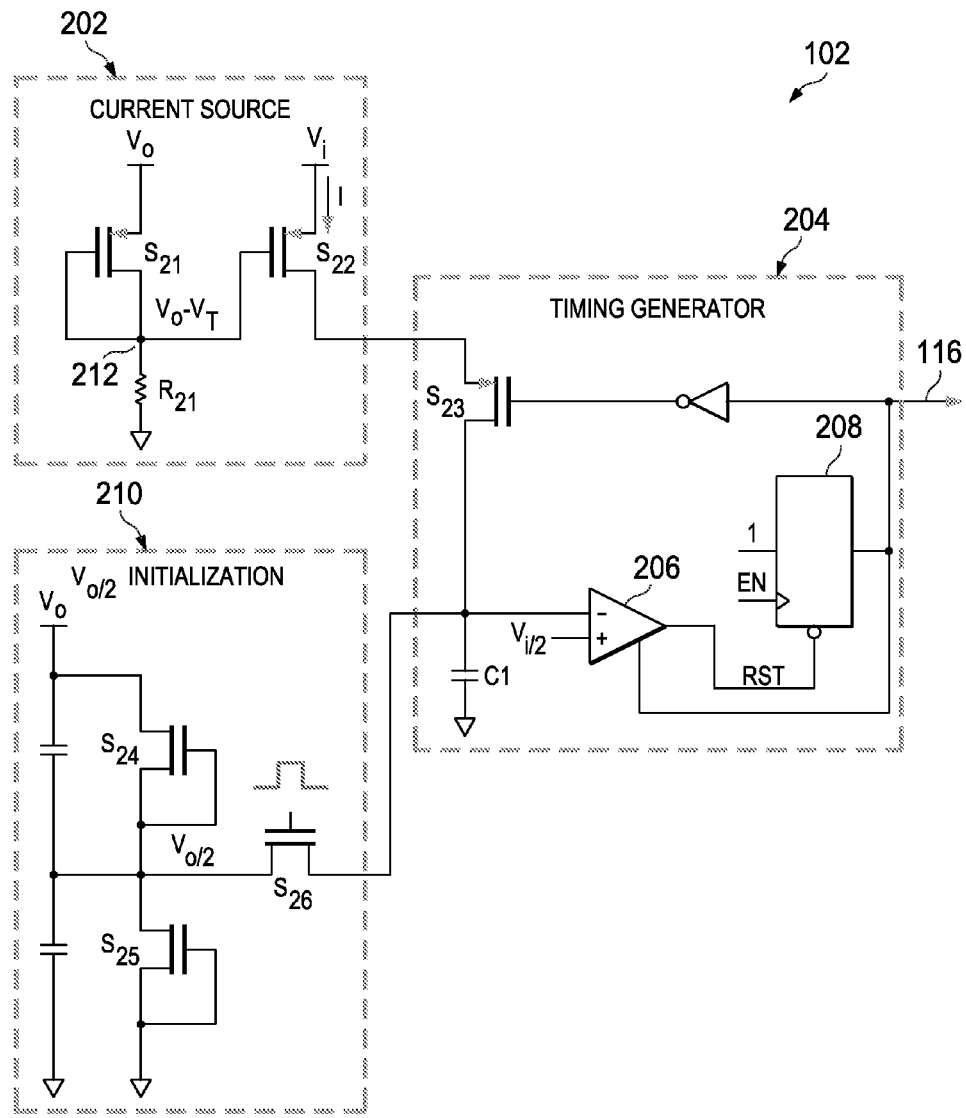
FIG. 2 shows a schematic diagram of a peak current controller for controlling peak current in an inductor of a switch mode power supply arranged as a buck converter in accordance with various embodiments.

In accordance with the above, embodiments of the peak current controller 102, control the peak current in the inductor L1 by generating high side switch activation timing $T_{H1}$ that is inversely proportional to $V_i-V_O$. FIG. 2 shows a schematic diagram of the peak current controller 102 in accordance with various embodiments. The peak current controller 102 includes a current source 202, a switch timing generator 204, and initialization circuitry 210. The current source 202 generates a current that is proportional to $V_i-V_O$. The current source includes transistors S21 and S22, and resistor R21. The gate of transistor S21 is coupled to the resistor R21 and to the drain of transistor S21. The source of transistor S21 is coupled to $V_O$, the voltage at the output of the inductor L1. The value of resistor R21 is large (e.g., in the range of megaohms), causing node 212 to settle at a voltage of $V_O-V_T$, where $V_T$ is the threshold voltage of transistor S21. The drain of transistor S21 is coupled to the gate of transistor S22. The source of transistor S22 is coupled to $V_i$, the voltage provided at the input side of inductor L1 when switch $S_{H1}$ is closed. Consequently, the gate-source voltage at transistor S22 is $V_i-V_O+V_T$, which in accordance with the metal oxide semiconductor (MOS) current equation:

$$I=K(V_{gs}-V_t)^2 \quad (4)$$

produces current through transistor S22 of:

$$I=K(V_i-V_O)^2. \quad (5)$$

Thus, the current source 202 generates a current that is proportional to the square of the difference of voltages at the input side and output side of the inductor L1 ($V_i-V_O$).

The switch timing generator 204 is coupled to the current source 202, and applies the current provided by the current source 202 to generate a high side switch timing signal 116 that is inversely proportional to $V_i-V_O$. The switch timing circuitry 204 includes a capacitor C1, a switching transistor S23, a comparator 206, and a flip/flop 208. The capacitor 208 forms charging node that is charged to $$\frac{V_O}{2}$$

by the initialization circuit 210. When the flip/flop 208 is set by transition of signal EN, the switch S23 is closed and current provided by the current source 202 flows through the switch S23 to charge the capacitor C1. When the voltage across the capacitor C1 increases from $$\frac{V_O}{2} \text{ to } \frac{V_i}{2}$$

the comparator 206 resets the flip/flop 208 and the switch C23 is opened. The signal 116 is provided to the high side switch $S_{H1}$ via the buffer 104 as shown in FIG. 1.

The current provided to the capacitor C1, may be expressed as:

$$I = C\frac{dV}{dt}, \quad (6)$$

and the charging time may be expressed as:

$$T = \frac{C(V_i - V_O)}{I} \quad (7)$$

Because the current (I) provided by the current source 202 is proportional to $(V_i-V_O)^2$, the time for which the flip/flop 208 is set, and the time for which the high side switch $S_{H1}$ is closed are proportional to $$\frac{1}{(V_i - V_O)}.$$

As noted above, holding the high side switch $S_{H1}$ active for a time inversely proportional to $(V_i-V_O)$ produces optimal peak current in the inductor L1. Thus, the peak current controller 102 produces peak current in the inductor L1.

When the flip/flop 208 is reset by the comparator 206, the flip/flop 110 is set after delay 108, and low side transistor $S_{L1}$ is activated until flip/flop 110 is reset by comparator 112. While the flip/flop 208 is reset, the capacitor C1 is discharged to $$\frac{V_O}{2}.$$

The initialization circuit 210 generates $$\frac{V_O}{2}.$$

The initialization circuit 210 includes transistors S24 and S25 arranged as diodes to form a voltage divider producing $$\frac{V_O}{2}, \frac{V_O}{2}$$

is switched to the capacitor C1, via switch S26, while the flip/flop 208 is reset is to precharge the capacitor C1 to $$\frac{V_O}{2}$$

in preparation for the next cycle of charging from $$\frac{V_O}{2}$$

to $$\frac{V_i}{2}.$$

The initialization circuit may include buffers or other circuitry to isolate the transistors S24 and S25 from the switch timing generator 204 and inhibit alteration of the $$\frac{V_O}{2}$$

voltage generated by the initialization circuit 210 while precharging the capacitor C1.

Figure 3:
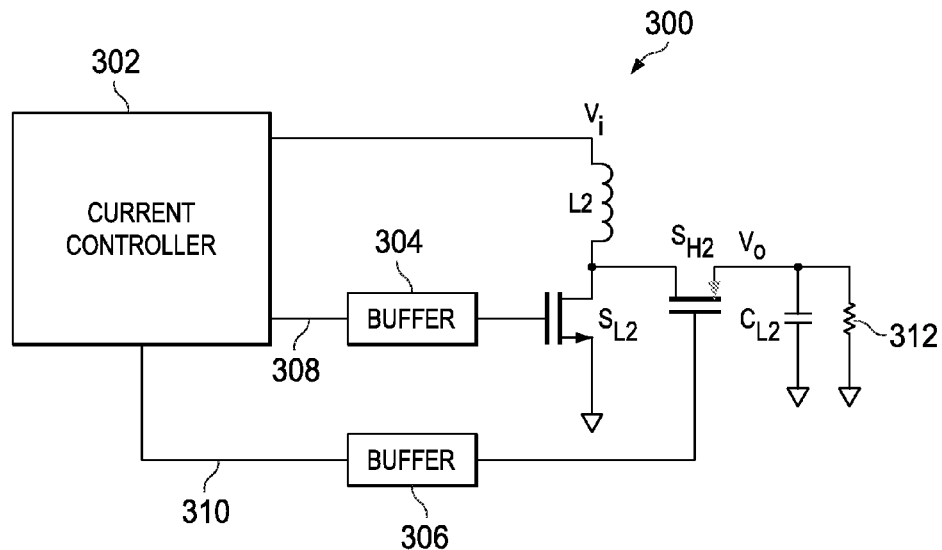
FIG. 3 shows a schematic diagram of a switch mode power supply arranged as a boost converter in accordance with various embodiments.

The current control techniques explained above are also applicable to predicting a zero crossing of inductor current in boost converters. By providing zero crossing prediction, embodiments allow for fabrication of boost converters using lower voltage processes than would be required for zero crossing detection methods used in conventional boost converters. FIG. 3 shows a schematic diagram of an SMPS 300 arranged as a boost converter in accordance with various embodiments. The SMPS 300 includes an inductor L2, switching transistors SL2 and SH2 arranged as high side and low side switches respectively, capacitor CL2, load 312, buffers 304 and 306, and current controller 302.

The current controller 302 closes the low side switch SL2 to induce current flow through the inductor L2 from input voltage source Vi. When low side switch SL2 is open, the current controller 302 may close the high side switch SH2 to charge the capacitor CL2 to the boosted voltage present at the output of the inductor L2. The current controller 302 generates the signals 308 and 310 that control the timing of the switching transistors SL2 and SH2 such that the timing of inductor current zero crossing is predicted.

As per equation (1) above:

$$V = L\frac{di}{dt}. \quad (8)$$

Accordingly, active time for the low side switch SL2 is:

$$T_{L2} = \frac{LI_P}{V_i}, \quad (9)$$

and active time for the high side switch SH2 is:

$$T_{H2} = \frac{LI_P}{(V_O - V_i)}, \quad (10)$$

where:
$I_P$ is the peak current in the inductor L2;
L is the inductance of the inductor L2;
$V_i$ is the voltage at the input side of the inductor L2;
$V_O$ is the voltage at the output side of the inductor L2;

$T_{L2}$ is the time during which the low side switch $S_{L2}$ is closed; and $T_{H2}$ is the time during which the high side switch $S_{H2}$ is closed.

Thus, the relative active times of transistors SL2 and SH2 may be expressed as:

$$\frac{T_{L2}}{T_{H2}} = \frac{(V_O - V_i)}{V_i} \tag{11}$$

Figure 4:
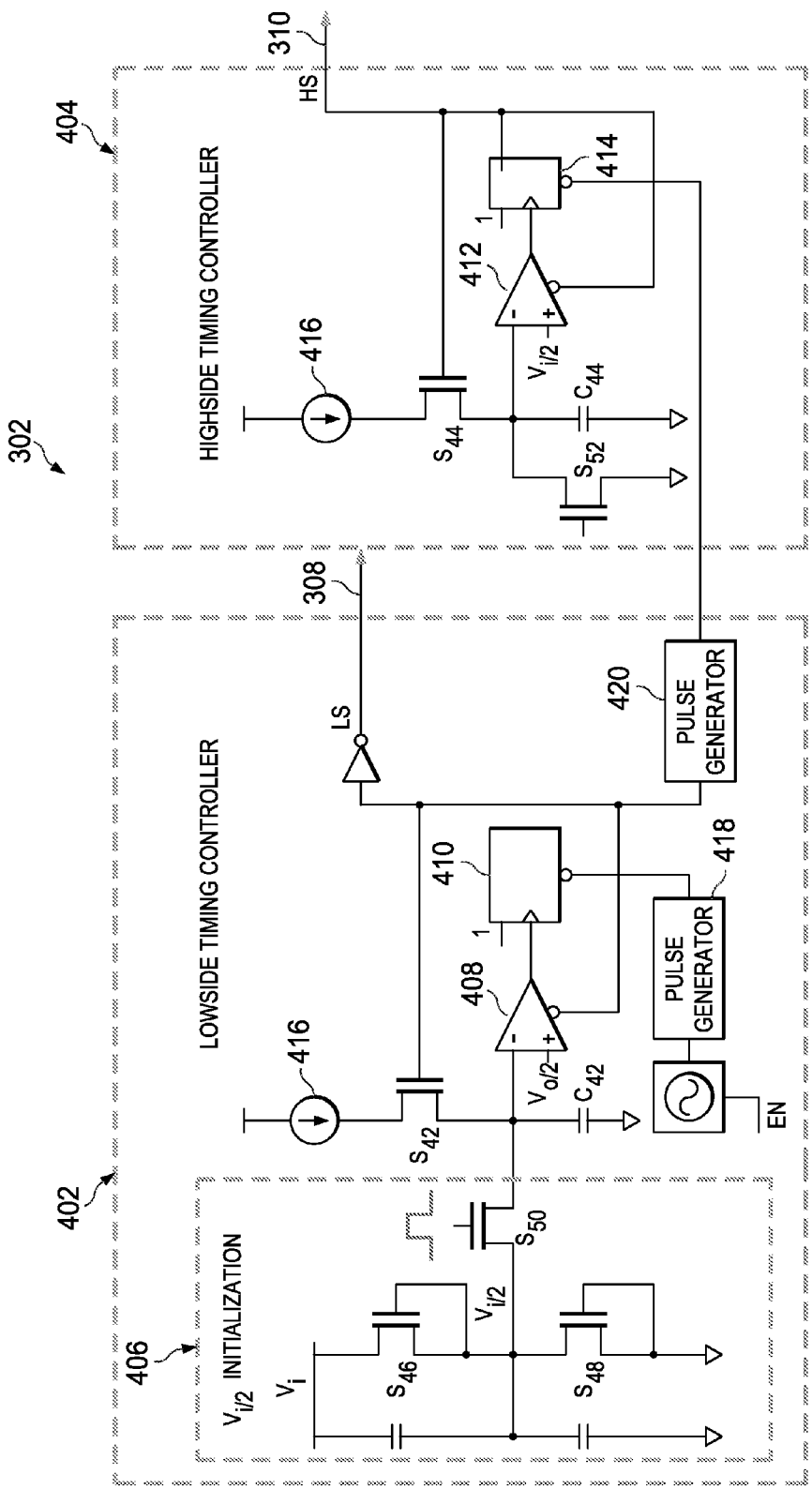
FIG. 4 shows a schematic diagram of a peak current controller for controlling peak current in an inductor of a switch mode power supply arranged as a boost converter in accordance with various embodiments.

Embodiments of the current controller 302 provide low side switch activation timing that is proportional to $V_O-V_i$, and high side switch activation timing that is proportional to $V_i$ to predict the current zero crossing in the inductor L2:

FIG. 4 shows a schematic diagram of the current controller 302 in accordance with various embodiments. The current controller 302 includes a low side timing generator 402 and a high side timing generator 404. The low side timing generator 402 provides timing signal 308 that controls activation of the low side switch SL2. The high side timing generator 404 provides timing signal 310 that controls activation of the high side switch SH2.

The low side timing generator 402 includes a constant current source 416, a switching transistor S42, a capacitor C42, a flop/flop 410, a comparator 408, and an initialization circuit 406. The capacitor C42 forms charging node that is precharged to $$\frac{V_i}{2}$$

by the initialization circuit 406. When the flip/flop 410 is reset by a pulse from the pulse generator 418, the switch S42 is closed and constant current provided by the current source 416 charges the capacitor C42. When the voltage across the capacitor C42 reaches $$\frac{V_O}{2}$$

the comparator 408 sets the flip/flop 410. The signal 308 generated by the flip/flop 410 controls the low side switch $S_{L2}$ via the buffer 304 as shown in FIG. 3.

Because the capacitor C42 is precharged to $$\frac{V_i}{2},$$

and the current source 416 provides a constant current, the time to charge the capacitor C42 from $$\frac{V_i}{2}$$

to $$\frac{V_O}{2}$$

is:

$$T = \frac{C}{I} \frac{(V_O - V_i)}{2}. \tag{12}$$

Accordingly, the time that the low side switch $S_{L2}$ is closed via signal 308 is proportional to $V_O-V_i$.

While the flip/flop 410 is set, the capacitor C42 is discharged to $$\frac{V_i}{2}.$$

The initialization circuit 406 generates $$\frac{V_i}{2}.$$

The initialization circuit 406 includes transistors S46 and S48 arranged as diodes to form a voltage divider producing $$\frac{V_i}{2}. \frac{V_i}{2}$$

is routed to the capacitor C42, via switch S50, while the flip/flop 410 is set to precharge the capacitor C42 to $$\frac{V_i}{2}$$

in preparation for the next cycle of charging from $$\frac{V_i}{2}$$

to $$\frac{V_O}{2}.$$

The initialization circuit 406 may include buffers or other circuitry to isolate the transistors S46 and S48 from the low side timing generator 402 and inhibit alteration of the $$\frac{V_i}{2}$$

voltage generated by the initialization circuit 406 while precharging the capacitor C42.

The high side timing generator 404 is coupled to the low side timing generator 402, and triggered when flip/flop 410 of the high side timing generator is set and the low side switch SL2 is deactivated. The high side timing generator 404 includes a constant current source 416, a switching transistor S44, a capacitor C44, a flop/flop 414, a comparator 412, and an initialization switch S52. The current source 416 of the high side timing generator 404 produces a current equivalent to that produced by the current source 416 of the low side timing generator 402. Because constant current need be provided to only one of the low side timing generator 402 and the high side timing generator 404 at a time, some embodiments of the current controller 302 may share an instance of the current source 416 between the timing generators 402 and 404.

The capacitor C44 forms charging node that is discharged to ground voltage by the initialization switch S52. When the flip/flop 414 is reset by a pulse from the pulse generator 420, the switch S44 is closed and constant current provided by the current source 416 charges the capacitor C44. When the voltage across the capacitor C44 reaches $$\frac{V_i}{2}$$

the comparator 412 sets the flip/flop 414. The signal 310 generated by the flip/flop 414 controls the high side switch $S_{H2}$ via the buffer 306 as shown in FIG. 3. While the flip/flop 414 is set, the initialization switch S52 is closed to discharge the capacitor C44 to ground voltage in preparation for the next cycle of charging from ground to $$\frac{V_i}{2}.$$

Because the capacitor C44 is precharged to ground voltage, and the current source 416 provides a constant current, the time to charge the capacitor C42 is proportional to $V_i$. Thus, the low side timing generator 402 and the high side timing generator 404 conjunctively provide control timing for the switches $S_{L2}$ and $S_{H2}$ such the active time for the switches $S_{L2}$ and $S_{H2}$ is proportional to $$\frac{(V_O - V_i)}{V_i}.$$

Figure 5:
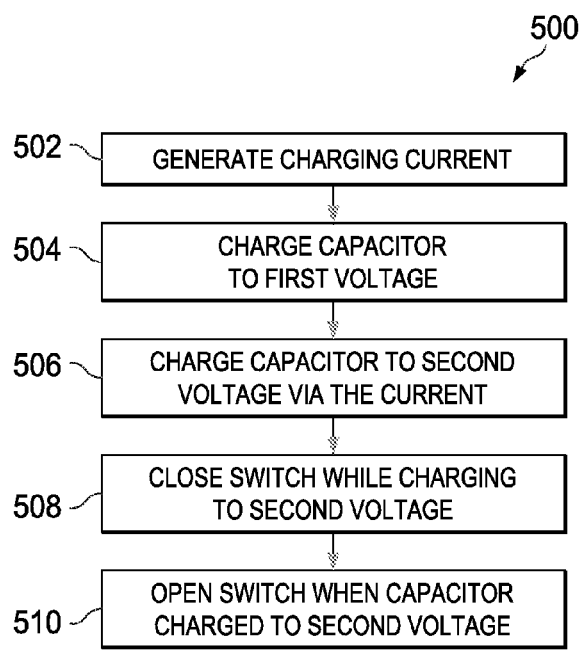
FIG. 5 shows a flow diagram for a method for controlling peak current in a switch mode power supply in accordance with various embodiments.

FIG. 5 shows a flow diagram for a method 500 for controlling current in an inductor of an SMPS in accordance with various embodiments. The method 500 is applicable to controlling peak current in the inductor and/or to predicting a zero crossing of current in the inductor. Though depicted sequentially as a matter of convenience, at least some of the actions shown can be performed in a different order and/or performed in parallel. Additionally, some embodiments may perform only some of the actions shown.

In block 502, a current is generated. The current may be proportional to $V_i - V_O$ in some embodiments. For example, the current may be $K(V_i-V_O)^2$ as generated by the current source 202 for use in buck converter timing generation. In some embodiments, the current may be a predetermined constant current.

In block 504, a capacitor is precharged to a first voltage. For a buck converter, the capacitor may be precharged to $$\frac{V_O}{2}.$$

For a boost converter, a first capacitor may be precharged to $$\frac{V_i}{2},$$

and a second capacitor may be precharged to ground voltage.

In block 506, the capacitor is charged from the first voltage to a second voltage via the current generated in block 502. In a buck converter, the capacitor may be charged from $$\frac{V_o}{2}$$

to $$\frac{V_i}{2}.$$

In a boost converter, the first capacitor may be charged from $$\frac{V_i}{2}$$

to $$\frac{V_0}{2},$$

and the second capacitor may subsequently be charged from ground voltage to $$\frac{V_i}{2}.$$

In block 508, a switch coupled to an inductor of the SMPS is closed for the duration of capacitor charging performed in block 506. In a buck converter, a high side switch is closed while charging the capacitor from $$\frac{V_o}{2}$$

to $$\frac{V_i}{2}.$$

In a boost converter, a low side switch is closed while charging the first capacitor from $$\frac{V_i}{2}$$

to $$\frac{V_o}{2},$$

and a high side switch is closed while charging the second capacitor from ground voltage to $$\frac{V_i}{2}.$$

In block 510, when the capacitor has been charged from the first voltage to the second voltage, the switch controlled via the capacitor is opened. In the buck converter, the high side switch is opened when the charging raises the capacitor voltage to $$\frac{V_i}{2}.$$

In the boost converter, the low side switch is opened when the charging raises first capacitor voltage from $$\frac{V_i}{2}$$

to $$\frac{V_o}{2},$$

and the high side switch is opened when the charging raises the second capacitor voltage from ground voltage to $$\frac{V_i}{2}.$$

The above discussion is meant to be illustrative of the principles and various implementations of the present disclosure. Numerous variations and modifications will become apparent to those skilled in the art once the above disclosure is fully appreciated. For example, various flip/flop signal polarities generated by the embodiments described herein may differ in other embodiments while producing equivalent switch control signals, the fractional portion of $V_I$ and $V_O$ may differ, etc. It is intended that the following claims be interpreted to embrace all such variations and modifications.

What is claimed is:

1. A switch mode power supply, comprising:
   an inductor;
   a high-side switch coupled to the inductor;
   a low-side switch coupled to the inductor; and
   a controller coupled to at least one of the high-side switch and the low-side switch, the controller comprising:
   a first capacitor; and
   a current source;
   wherein the controller is configured to control timing of current switching to the inductor by enabling current flow through the at least one of the high-side switch and the low-side switch based on time to charge the first capacitor via the current source;
   wherein the time is a function of voltage across the inductor;
   wherein the controller comprises an initialization circuit configured to charge the first capacitor to a first voltage that is a predetermined fraction of an output voltage at the inductor;
   wherein the controller is configured to:
   charge the first capacitor from the first voltage to a second voltage that is the predetermined fraction of an input voltage at the inductor, wherein the time to charge the first capacitor from the first voltage to the second voltage is inversely proportional to a difference of an input voltage at the inductor and the output voltage at the inductor; and
   enable current flow through the high side switch while charging the first capacitor from the first voltage to the second voltage.

2. The power supply of claim 1, wherein the current source is configured to generate a current that is proportional to a difference of an input voltage at the inductor and an output voltage at the inductor.

3. The power supply of claim 2, wherein the current corresponds to a square of the difference of the input voltage at the inductor and the output voltage at the inductor.

4. The power supply of claim 1, wherein the controller is configured to provide, via the timing at least one of peak current in the inductor, and predicted zero crossing time of current in the inductor.

5. A switch mode power supply, comprising:
   an inductor;
   a high-side switch coupled to the inductor;
   a low-side switch coupled to the inductor; and
   a controller coupled to at least one of the high-side switch and the low-side switch, the controller comprising:
   a first capacitor; and
   a current source;
   wherein the controller is configured to control timing of current switching to the inductor by enabling current flow through the at least one of the high-side switch and the low-side switch based on time to charge the first capacitor via the current source;
   wherein the time is a function of voltage across the inductor;
   wherein the controller comprises an initialization circuit configured to charge the first capacitor to a first voltage that is a predetermined fraction of an input voltage at the inductor;
   wherein the controller is configured to charge the first capacitor from the first voltage to a second voltage that is the predetermined fraction of an output voltage at the inductor, wherein the time to charge the first capacitor from the first voltage to the second voltage is proportional to a difference of an output voltage at the inductor and the input voltage at the inductor.

6. The power supply of claim 5, wherein the controller is configured to enable the low side switch while charging the first capacitor from the first voltage to the second voltage, and the power supply is a boost mode converter.

7. The power supply of claim 5, wherein the controller comprises:

a second capacitor; and
an initialization circuit configured to discharge the second capacitor to a ground voltage.

8. The power supply of claim 7, wherein the controller is configured to charge the second capacitor from the ground voltage to the first voltage, and the time to charge the second capacitor from the ground voltage to the first voltage is proportional to the input voltage at the inductor.

9. The power supply of claim 8, wherein the controller is configured to enable the high side switch in accordance with the time to charge the second capacitor from the ground voltage to the first voltage, and the power supply is a boost mode converter.

10. A controller for a switch mode power supply, comprising:
a current source; and
switch timing circuitry configured to control the switch timing of at least one of a high side transistor and a low side transistor that switch current in a inductor of the switch mode power supply, the timing circuitry comprising:
a first charging node that is coupled to the current source;
transistor driver circuitry configured to generate the timing based on time to change, via a current provided by the current source, a voltage at the charging node between voltages that are proportional to an input voltage of the inductor and an output voltage of the inductor;
wherein the timing provides at least one of a peak current in the inductor and a prediction of current zero crossing in the inductor;
the controller further comprising an initialization circuit configured to charge the first charging node to a first voltage that is a predetermined fraction of the output voltage at the inductor;
wherein the switch mode power supply is a buck converter; and
the switch timing circuitry is configured to:
charge the first charging node from the first voltage to a second voltage that is the predetermined fraction of the input voltage at the inductor;
wherein the time to charge the first charging node from the first voltage to the second voltage is inversely proportional to a difference of the input voltage at the inductor and the output voltage at the inductor; and
enable the high side transistor in accordance with the time to charge the first charging node from the first voltage to the second voltage.

11. The controller of claim 10, wherein the current source is configured to generate the current as a square of a difference of the input voltage at the inductor and the output voltage at the inductor.

12. A controller for a switch mode power supply, comprising:
a current source; and
switch timing circuitry configured to control the switch timing of at least one of a high side transistor and a low side transistor that switch current in a inductor of the switch mode power supply, the timing circuitry comprising:
a first charging node that is coupled to the current source;
transistor driver circuitry configured to generate the timing based on time to change, via a current provided by the current source, a voltage at the charging node between voltages that are proportional to an input voltage of the inductor and an output voltage of the inductor;
wherein the timing provides at least one of a peak current in the inductor and a prediction of current zero crossing in the inductor;
further comprising an initialization circuit configured to charge the first charging node to a first voltage that is a predetermined fraction of the input voltage at the inductor;
wherein the switch mode power supply is a boost converter; and
the switch timing circuitry is configured to:
charge the first charging node from the first voltage to a second voltage that is the predetermined fraction of the output voltage at the inductor, wherein the time to charge the first charging node from the first voltage to the second voltage is proportional to a difference of the output voltage at the inductor and the input voltage at the inductor;
and enable the low side transistor in accordance with the time to charge the first charging node from the first voltage to the second voltage.

13. The controller of claim 12, wherein the switch timing circuitry further comprises
a second charging node; and
an initialization circuit configured to discharge the second charging node to a ground voltage.

14. The controller of claim 13, wherein:
the switch timing circuitry is configured to:
charge the second charging node from the ground voltage to the first voltage, wherein the time to charge the second charging node from the ground voltage to the first voltage is proportional to the input voltage at the inductor; and
enable the high side transistor in accordance with the time to charge the second charging node from the ground voltage to the first voltage.

15. A method for controlling current in an inductor of a switch mode power supply, comprising:
charging a first capacitor from a first voltage to a second voltage; wherein the first and second voltages are proportional to the voltages at one of an input and an output of the inductor;
enabling one of a high side switch and a low side switch coupled to the inductor for the duration of the charging; and
providing at least one of peak current in the inductor and a prediction of current zero crossing in the inductor based on the duration of the charging;
charging the first capacitor to the first voltage;
wherein:
the first voltage is a predetermined fraction of the output voltage at the inductor;
the second voltage is the predetermined fraction of the input voltage at the inductor; and
time to charge the first capacitor from the first voltage to the second voltage is inversely proportional to a difference of the input voltage at the inductor and the output voltage at the inductor.

16. The method of claim 15, further comprising:
generating a current corresponding to a square of a difference of an input voltage at the inductor and an output voltage at the inductor;
wherein the charging comprising providing the current to the capacitor.

17. The method of claim 15, further comprising:
discharging a second capacitor to a ground voltage;
charging the second capacitor from the ground voltage to the first voltage, wherein the time to charge the second capacitor from the ground voltage to the first voltage is proportional to the input voltage at the inductor; and enabling the high side switch in accordance with the time to charge the second capacitor from the ground voltage to the first voltage.

18. A method for controlling current in an inductor of a switch mode power supply, comprising:

charging a first capacitor from a first voltage to a second voltage; wherein the first and second voltages are proportional to the voltages at one of an input and an output of the inductor;

enabling one of a high side switch and a low side switch coupled to the inductor for the duration of the charging; and providing at least one of peak current in the inductor and a prediction of current zero crossing in the inductor based on the duration of the charging;

further comprising:

charging the first capacitor to a first voltage; wherein the first voltage is a predetermined fraction of the input voltage at the inductor;

charging the first capacitor from the first voltage to a second voltage that is the predetermined fraction of an output voltage at the inductor, wherein the time to charge the first capacitor from the first voltage to the second voltage is proportional to a difference of an output voltage at the inductor and the input voltage at the inductor; and enabling the low side switch in accordance with the time to charge the first capacitor from the first voltage to the second voltage.

* * * * *